United States Patent [19]

Thompson et al.

[11] 4,049,879

[45] Sept. 20, 1977

[54] INTERCALATED TRANSITION METAL PHOSPHORUS TRISULFIDES

[75] Inventors: Arthur H. Thompson, New Providence; M. Stanley Whittingham, Fanwood, both of N.J.

[73] Assignee: Exxon Research & Engineering Co., Linden, N.J.

[21] Appl. No.: 677,889

[22] Filed: Apr. 19, 1976

[51] Int. Cl.² ............................................. H01M 10/00
[52] U.S. Cl. .................................... 429/191; 429/194; 429/218; 429/221; 429/223; 423/303
[58] Field of Search ............... 429/194, 218, 221, 223, 429/103, 104; 423/303, 511, 299, 191

[56] References Cited

U.S. PATENT DOCUMENTS

| | | | |
|---|---|---|---|
| 3,514,337 | 5/1970 | Braeuer | 429/218 X |
| 3,791,867 | 2/1974 | Broadhead et al. | 429/194 X |
| 3,827,910 | 8/1974 | Cairns et al. | 429/218 X |
| 3,864,167 | 2/1975 | Broadhead et al. | 429/194 |

*Primary Examiner*—Anthony Skapars
*Attorney, Agent, or Firm*—Joseph J. Dvorak

[57] ABSTRACT

A new composition of matter corresponds to the formula $A_xM(PS_3)_y$ wherein A is at least one Group Ia metal, $x$ is a numerical value greater than zero but equal to or less than 6 divided by the valency of the element, M is at least one transition metal selected from the group consisting of nickel or iron, P is phosphorus, S is sulfur and $y$ is a numerical value between about 0.9 and 1.0. These materials are useful as cathode materials in electrochemical cells and as thermal collectors from solar radiation.

Compositions of the present invention are used in fabricating rechargeable electrochemical cells in the discharged state which comprise an anode containing as the anode-active material at least one Group Ia metal; a cathode containing as the cathode-active material a non stoichiometric trisulfide of the formula $A_xM(PS_3)_y$ wherein A is at least one Group Ia metal, $y$ is a numerical value greater than zero but equal to or less than 6 divided by the valency of the element, M is at least one transition metal selected from the group consisting of iron and nickel, and $y$ is a numerical value between about 0.9 and 1; and an electrolyte that is inert to the anode and cathode and permits migration of ions of at least the anode-active material to react with the cathode-active material.

25 Claims, 1 Drawing Figure

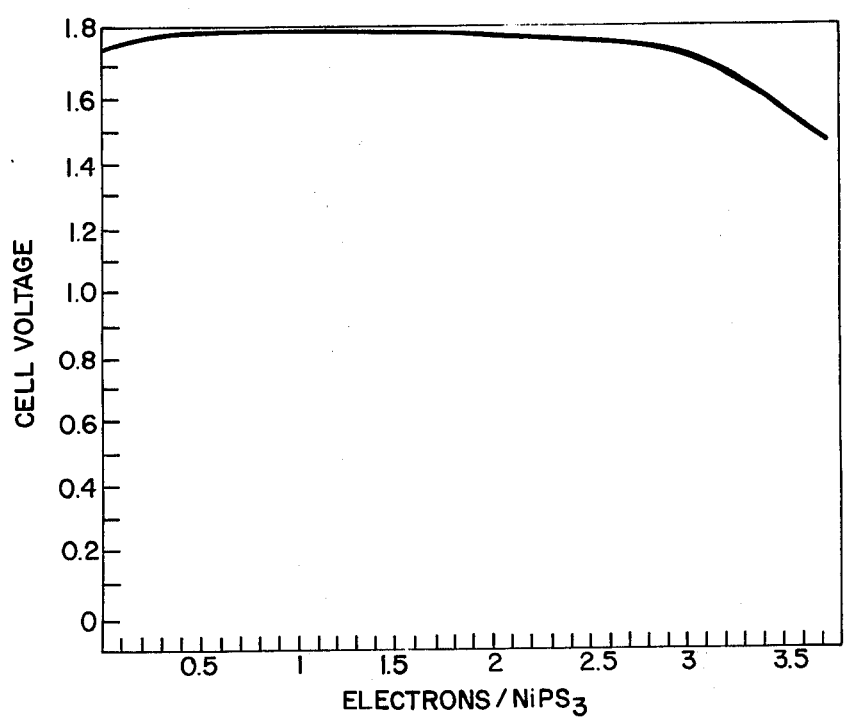

INTERCALATED TRANSITION METAL PHOSPHORUS TRISULFIDES

BACKGROUND OF THE INVENTION

The present invention relates to a novel composition of matter and to discharged electrochemical cells containing the composition of matter as cathode-active materials.

Many potential uses for packaged power exceed the capacity of existing electrochemical cells, and much effort has been recently directed to the development of high energy density electrochemical cells. The ideal electrochemical cell would be one that could take full advantage of the differences in the electrochemical potentials between the highly electropositive alkali metals, particularly lithium, and the highly electronegative halides, particularly fluorine. The reactive nature of both the alkali metals and the halides make the use of these substances in electrochemical cells very difficult. The problems have caused much attention to be focused on the selection and preparation of cathode-active materials that can be used in conjunction with alkali metal anodes.

It has been suggested, for example, that compounds of graphite and fluorine which can be intercalated be used as the cathode-active material and that lithium metal or alloys thereof be used as the anode-active material. See U.S. Pat. No. 3,514,337. Although such batteries have relatively high energy densities, a serious drawback is that such batteries cannot be recharged, i.e. they are primary rather than secondary batteries. It has also been suggested to employ transition metal dichalcogenides that have a layered structure as the cathode-active material. When using transition metal dichalcogenides as cathodeactive materials, ion species of the anode-active material intercalate the layered structure of the transition metal dichalcogenide upon discharge of the battery. The ions of the anode-active material can be deintercalated from the cathode material by reversing the current, i.e. the battery can be recharged. Of the transition metal dichalcogenides, titanium disulfide has been found to be the most useful as a cathode-active material. One of the problems associated with the use of titanium disulfide as a cathode-active material is cost, titanium in and by itself is quite expensive and the processing of titanium to titanium disulfide further increases the cost.

BRIEF SUMMARY OF THE INVENTION

Generally speaking, the present invention relates to a novel composition of matter which corresponds to the formula $A_xM(PS_3)_y$ wherein A is at least one Group Ia metal, $x$ is a numerical value greater than zero but equal to or less than about 6 divided by the valency of the element, M is at least one transition metal selected from the group consisting of nickel or iron, P is phosphorus, S is sulfur and $y$ is a numerical value between about 0.9 and 1. These materials are useful as cathode-active materials in the fabrication of secondary electrochemical cells in the discharged state and as thermal collectors of solar radiation.

As noted hereinbefore, the composition of matter can be used in fabricating discharged secondary electrochemical cells. Such high energy density electrochemical cells in the discharged state comprise an anode consisting essentially of an anode-active material of at least one element selected from the group consisting of Group Ia metals, magnesium, calcium, zinc and aluminum; a cathode having as its cathode-active material at least one non stoichiometric transition metal phosphorus trisulfide corresponding to the formula $A_xM(PS_3)_y$ where A is at least one Group Ia metal, $x$ is a numerical value greater than zero and is equal to or less than about 6 divided by the valency of the element, M is at least one transition metal selected from the group consisting of iron and nickel and $y$ is a numerical value between about 0.9 and 1.0; and an electrolyte of a medium in which the ions of the anode-active material or other current carriers can migrate from one electrode to the other. In the charged state, the electrochemical cell comprises an anode-active material and an electrolyte, as described above, and a cathode-active material corresponding to $M(PS_3)_y$ wherein M is at least one transition metal selected from the group consisting of nickel and iron, P is phosphorus, S is sulfur and $y$ is a numerical value between about 0.9 and 1.

The word "Group" when applied to one or more elements refers to a particular Group of the Periodic Table of the Elements as set forth on the inside cover of Lange's Handbook of Chemistry (11th ed.).

DESCRIPTION OF THE DRAWING

The FIGURE is a graph of cell potential versus capacity utilization for an electrical cell employing a nickel phosphorus trisulfide cathode-active material in accordance with the present invention.

DETAILED DESCRIPTION

The present invention relates to a new composition of matter which corresponds to the formula $A_xM(PS_3)_y$ wherein A is at least one Group Ia metal, $x$ is a numerical value greater than zero but equal to or less than about 6 divided by the valency of the element, M is at least one transition metal selected from the group consisting of nickel or iron, P is phosphorus, S is sulfur and $y$ is a numerical value between about 0.9 and 1.0. The compositions of matter of the present invention are non-stoichiometric transition metal phosphorus trisulfides. Nickel and/or iron phosphorus trisulfide have laminate structures in which repeating layers are bound to each other by comparatively weak van der Waal forces and each layer comprises two planes of sulfur atoms separated from each other by a plane of a combination of transition metal and phosphorus atoms. The non-stoichiometric compounds of the present invention are formed by reacting the transition metal phosphorus trisulfide with Lewis bases such as Group Ia metals. For example, nickel phosphorus trisulfide can be reacted at room temperature with a solution of N-butyllithium in hexane. While not wishing to be bound by any theory, the Lewis bases are believed to combine with the trisulfide by entering between the layers of the trisulfide laminated structure.

In general, the compounds of the present invention can be considered to be intercalated transition metal trisulfides, and the number of atoms of the intercalated species, i.e. Lewis bases, contained in each molecule of the compound varies from zero to less than about six. Some properties, such as thermal absorption of solar energy, will change continuously as the number of intercalated atoms increases from zero to maximum number of atoms which can be accommodated by the trisulfide.

Specific examples of compound in accordance with the present invention are as follows:

$Li_4NiPS_3$
$Li_4FePS_3$
$Na_5NiPS_3$
$Na_5FePS_3$
$K_6NiPS_3$
$K_6FePS_3$
$Li_3NiPS_3$
$Li_3FePS_3$

In the above examples of compounds, in accordance with the present invention, the amounts of the Group Ia metal are shown as whole numbers but those skilled in the art will recognize that intercalated compounds need not be stoichiometric and that the intercalated species can be present in over the entire range of permissible limits as set forth herein.

The above examples of non-stoichiometric compounds were homogeneous to the extent that they contain the same Group Ia metal and transition metal. However, it is also contemplated that the non-stoichiometric compound can contain one or more of the Group Ia elements and/or one or more transition metals. Thus, the following compounds are also examples of compounds within the scope of the present invention:

$LiNaNiPS_3$
$LiNaFePS_3$
$LiNaKNiPS_3$
$LiNaKFePS_3$
$Li_4(FeNi)PS_3$
$Na_4(FeNi)PS_3$
$LiNa(NiFe)PS_3$
$LiK(NiFe)PS_3$

As noted hereinbefore, the non-stoichiometric transition metal phosphorus trisulfides are useful as cathode-active materials and are used in the fabrication of secondary electrochemical cells in the discharged state. Such electrochemical cells in accordance with the present invention include an anode containing an anode-active material, a cathode having as its cathode-active material at least one non-stoichiometric transition metal phosphorus trisulfide in accordance with the present invention, and an electrolyte consisting of an ionic salt of the anode-active material or other current carrying ions. Useful anode-active materials are known in the art and include alkali metals, magnesium, calcium, aluminum, zinc and combinations thereof. A particularly useful anode-active material is a lithium-aluminum alloy containing between about 30 and 66% lithium, by weight. The anodes can be fabricated by well-known means. For example, pre-alloyed lithium aluminum powders can be compacted in a suitable die. Preferably, the prealloyed powder is compacted about a chemically inert but electrically conductive metal which in use improves current collection and provides the anode with structural integrity.

It has been found that only the Group Ia metal compounds of $NiPS_3$ and $FePS_3$ exhibit cathode-active properties. The cathode-active material is a non-stoichiometric transition metal phosphorus trisulfide that has a layered structure and corresponds to the formula $A_xM(PS_3)_y$ wherein A is at least one Group Ia metal, $x$ is a numerical value greater than zero but equal to or less than 6 divided by the valency of the element, M is nickel and/or iron, and $y$ is a numerical value between about 0.9 and 1.0. Intercalated nickel phosphorus trisulfide (e.g., $Li_4NiPS_3$) has been found particularly advantageous as a cathode-active material as 4 moles of lithium are accommodated in each mole of the trisulfide. The ability of a mole of nickel and iron phosphorus trisulfide to react with one or more moles of lithium ion or other alkali metal ion is an important feature because this characteristic is a measure of the capacity of the cathode-active material and as the cathode capacity increases so does the overall energy density of the cell. Not only do the cathode-active materials of the present invention have high capacities, but the discharge characteristics are highly advantageous in that the discharge curves are comparatively flat as shown in the FIGURE and in Example IV.

Another property of the intercalated transition metal phosphorus trisulfides that make them useful as cathode-active materials is their electrical conductivity. Although their conductivity is not as great as metallic conductors, such as copper, aluminum or stainless steel, the transition metal phosphorus trichalcogenides display sufficient conductivity that separate conductive diluents, such as carbon, do not have to be employed.

Cathodes of the intercalated transition metal phosphorus trisulfides can be prepared therefrom by known techniques. The compound can be hot pressed into the desired cathode form. Another method of preparing the cathode is by mixing Teflon powder, 1 to 20% by weight, with the cathode-active material and then pressing into an expanded metal grid.

The electrolyte as noted hereinbefore is a medium that is inert to both the anode and the cathode and that can pass ions of the anode-active material. This medium can be solid, liquid, aqueous or nonaqueous, and/or a molten salt. It can be a mixture of two or more substances as long as the resulting mixture is inert to both the anode and the cathode and can still dissolve and permit transport of the ions of the anode-active material. Examples of such media include sodium beta alumina, solid lithium iodide, molten alkali metal halides (either singly, together or admixed with Group IIa or Al halides), ionic salts of the anode-active material dissolved in polar solvents and combinations thereof. The ionic salts should be present in the electrolyte in amounts of at least about 0.1 molar, and preferably at least about 1 molar. Particularly advantageous electrolytes are: lithium perchlorate dissolved in organic ethers such as dimethoxyethane, tetrahydrofuran and dioxolane; lithium chloride, and/or potassium chloride containing melts; lithium aluminum chloride when the anode contains lithium; and, sodium beta alumina and sodium aluminum halide, either singly or in combination when the anode contains sodium.

The electrochemical cells can be prepared in the charged or discharged states. The cathode, prepared as described above, can be reacted with n-butyllithium, if the anode-active material is to be lithium or alloys thereof, to form a lithiated cathode which is in the discharged state. The anode is spaced from the cathode and the electrolyte is added thereto. After assembly, the electrochemical cell is ready for use by charging by well-known means. Alternatively, the electrochemical cell can be prepared in the charged state by assembling a cathode of the transition metal phosphorus trichalcogenide in the unreacted state, the anode consisting essentially of the anode-active material or alloys thereof, and the electrolyte in a sealed container. In those instances where the anode is a reactive metal, such as lithium, it is advantageous to prepare the electrochemical cell in the discharged state to minimize the hazards associated with handling highly reactive metals under ambient conditions.

In order to give those skilled in the art a better understanding of the present invention, the following illustrative examples are given:

EXAMPLE 1

Samples of iron phosphorus trisulfide, nickel phosphorus trisulfide and manganese phosphorus trisulfide were prepared by adding stoichiometric amounts of the elements along with reaction-promoting amounts of iodine to quartz tubes. The tubes were evacuated, sealed and heated at 700° C for 10 days. The plate-like single crystals of approximately 1 centimeter in length were contacted with a wire current collector and then immersed in an electrolyte of propylene carbonate saturated with lithium hexafluorophosphate. The electrochemical cells was completed with metallic lithium anodes.

The electrochemical cell having the iron phosphorus trisulfide cathode had an EMF of 2.7 volts and was discharged at currents up to 200 microamperes ($\mu$ amps).

The cell having the nickel phosphorus trisulfide cathode had an initial EMF of 3.1 volts and was discharged at currents up to 250 $\mu$ amps. About 1.3 moles of lithium per mole of nickel phosphorus trisulfide were consumed to the cutoff voltage of 1.38 volts, i.e. a compound corresponding to the formula $Li_{1.3}NiPS_3$ was electrochemically produced at the cathode during the discharge reaction.

The cell having the manganese phosphorus trisulfide cathode had an initial EMF of 2.48 volts and showed a sharp polarization even when discharging at a current of only 10 $\mu$ amps, thereby giving only negligible capacity utilization. The foregoing example demonstrates that not all transition metal phosphorus trisulfides can be intercalated or are useful as cathode-active materials.

EXAMPLE 2

This example demonstrates the production of intercalated nickel phosphorus trisulfide compounds. Nickel phosphorus trisulfide, prepared as described in Example 1 and in an amount of 0.121 gram, was placed in a reaction vessel containing 2 milliliters of n-butyllithium, which was a commercially available solution of 1.57 molar n-butyllithium in normal hexane, to which normal hexane was added to bring the volume to 10 milliliters. This was allowed to react for six days. The reacted trisulfide was separated from the solution and 35 milliliters of 0.1 N hydrochloric was added to the solution. Back titration of the hydrochloric acid solution required 31.4 milliliters of 0.1 N sodium hydroxide. Thus, 4.28 moles of n-butyllithium reacted with each mole of nickel phosphorus trisulfide.

In a similar manner, 0.100 gram of nickel phosphorus trisulfide was reacted with 10 milliliters of sodium naphthalide in the form of an 0.325 molar solution for 6 days. After the solid reaction product was separated from the solution, the solution was treated with hydrochloric acid and back titrated with sodium hydroxide to determine that 4.9 moles of sodium naphthalide reacted with each mole of the trisulfide.

Potassium naphthalide was reacted with nickel phosphorus trisulfide in the manner described immediately above. This test showed that 5.5 moles of potassium naphthalide reacted with each mole of the trisulfide.

EXAMPLE 3

Manganese phosphorus trisulfide in an amount of 0.4298 gram was reacted with 2.4 milliliters of 3.5 molar solution of n-butyllithium plus 1 milliliter of hexane for 12 days. Nickel phosphorus trisulfide and iron phosphorus trisulfide in amounts of 0.3174 and 0.3081 gram, respectively, were reacted with 1.7 milliliters of the same solution for the same period of time. Back titration of the resulting solution indicated that each mole of the manganese compound reacted with less than 0.005 mole of the n-butyllithium whereas 1.49 and 1.50 moles of n-butyllithium reacted with the nickel and iron compounds, respectively. This example shows that intercalated nickel and iron phosphorus trisulfides have cathodic properties while the corresponding manganese compound does not.

EXAMPLE 4

Nickel phosphorus trisulfide was prepared by adding 3.15 grams of nickel, 1.66 grams of phosphorus, 5.17 grams of sulfur and 0.35 gram of iodine to a quartz tube, then evacuating and sealing the tube and gradually heating and holding the tube at 700 ° C for 2 weeks. X-ray analysis confirmed the production of nickel phosphorus trisulfide. The nickel phosphorus trisulfide was mixed with 10% by weight of polyfluoroethylene powder, and the resulting mixture was hot pressed into expanded nickel grids. One of these grids containing 73 milligrams of the trisulfide and having a surface area of 2 square centimeters was immersed in an electrolyte of lithium perchlorate dissolved in a 70:30 mixture of tetrahydrofuran and dimethoxyethane to function as a cathode and the cell was completed by wrapping a lithium anode around the immersed cathode. The cell had an initial voltage of 2.4 volts and was discharged at a current of 4 milliamperes (Ma). The cell potential remained quite constant at 1.8 volts during discharge and over 3.6 moles of lithium per mole of nickel phosphorus trisulfide were consumed during discharge, i.e. $Li_{3.6}NiPS_3$, was formed electrochemically. The discharge curve is shown in the accompanying figure.

The discharged cell was then charged with a 4 Ma current until the same number of coulombs had been passed, at which point the charge voltage rose to 2.7 volts. The charged cell wash then discharged to about 50% capacity, at which point the cell was cycled 18 minutes on charge, followed by 18 minutes discharge at 4 Ma. Such cycling was repeated 50 times before loss of electrolyte caused the cell to fail.

The theoretical energy density of the cell, assuming a four-electron discharge reaction, is about one kilowatt hour per kilogram of active material.

EXAMPLE 5

Nickel phosphorus trisulfide, prepared as in Example 4, was mixed with 10% by weight of polyfluoroethylene powder and the resulting mixture hot pressed into expanded stainless steel grids. One of these grids to be used as a cathode and containing 90 milligrams of the trisulfide and having a surface area of 2 square centimeters was immersed in an electrolyte of 2.5 molar lithium perchlorate dissolved in dioxolane and was wrapped with lithium metal to serve as the anode. The cell had an initial voltage of 2.5 volts and was discharged at a current of 1 milliampere. The cell potential remained constant at 1.8 volts during an initial discharge of 1.5 moles of lithium per mole of nickel phosphorus trisulfide and then dropped to 1.5 volts until a total of 4.5 moles of lithium per mole of $NiPS_3$ were consumed, i.e. $Li_{4.5}NiPS_3$ was formed electrochemically.

The discharged cell was then charged with 1 Ma current until one mole of lithium per mole of $NiPS_3$ had been charged, i.e. replated on the lithium anode.

EXAMPLE 6

Nickel phosphorus trisulfide, prepared as in Example 4, was mixed with an equal weight amount of graphite to serve as a conducting diluent. This mixture was then further mixed with 10 weight percent of polyfluoroethylene powder and the resulting mixture was hot pressed into expanded stainless steel grids. One of these grids to be used as a cathode and containing 15.9 milligrams of the trisulfide and having a surface area of approximately one square centimeter was immersed in an electrolyte of 2.5 molar lithium perchlorate dissolved in dioxolane and was wrapped with lithium metal to serve as the anode. The cell had an initial voltage of 2.5 volts and was repetitively discharged and charged at a current of one milliampere. On each cycle the cathode was discharged to 33% of capacity, i.e. to a composition of $Li_{1.5}NiPS_3$. Such cycling was repeated 20 times.

EXAMPLE 7

Iron phosphorus trisulfide and nickel phosphorus trisulfide, prepared as in Example 1, were each mixed with equal weights of graphite to serve as a conducting diluent. These mixtures were then further mixed with 10 weight percent of polyfluoroethylene powder and the resulting mixture was hot pressed into expanded stainless steel grids. Several of these grids were then treated with n-butyllithium for 6 days as in Example 2. The grids were then separated from the n-butyllithium. One of these grids to be used as a cathode and containing 0.0175 grams of lithiated $NiPS_3$ and having a surface area of approximately 1 square centimeter was immersed in an electrolyte of 2.5 molar lithium perchlorate dissolved in dioxolane and was wrapped with lithium metal foil to serve as the anode. The cell had an initial voltage of 1.5 volts and was charged at a current of 1 milliampere until 1.5 moles of lithium per mole of $NiPS_3$ had been deposited on the lithium anode. The cell was then repetitively charged and discharged using currents of 1 milliampere and passing 1.5 moles of lithium on each charge and discharge until 50 cycles were complete.

A second grid containing 0.0141 gram of lithiated $FePS_3$ was immersed in electrolyte and surrounded by lithium metal in a manner similar to the $NiPS_3$ cathode in this example. This cell also had an initial voltage of 1.5 volts and was repetitively cycled 20 times to a depth of 1.5 moles of lithium per moles of $FePS_3$.

EXAMPLE 8

The lithiated product of $MPS_3$ where M is Ni or Fe may be useful as a thermal collector of solar radiation. In an example $NiPS_3$ and $Li_4NiPS_3$ were compared to flat black paint and powdered graphite. In the test, a reference (paint or graphite) was placed in thermal contact with one junction of a thermocouple and the sample ($Li_4NiPS_3$ or $NiPS_3$) was placed in thermal contact with the second junction. The sample and reference were then uniformly illuminated with an incandescent lamp and the temperature changes monitored. In each case the sample became hotter than the reference. The temperature of the $NiPS_3$ increased 18% more than the graphite reference and 35% more than the paint reference. The temperature of the $Li_4NiPS_3$ increased 41% more than the graphite reference and 56% more than the black paint reference. These figures show that both $NiPS_3$ and $Li_4NiPS_3$ are good absorbers of visible radiation. In particular, $Li_4NiPS_3$ is a superior absorber.

Although the present invention has been described in conjunction with preferred embodiments, it is to be understood that modifications and variations may be resorted to without departing from the scope of the invention, as those skilled in the art will readily understand. For example, the compositions of matter can be modified by substituting at least one metal selected from the group consisting of aluminum, calcium, magnesium and zinc in whole or in part for the Group Ia metal. Thus, compositions of matter in accordance with the present invention can be represented as $A_xM(PS_3)_y$ wherein A is at least one element selected from the group consisting of Group Ia metals, aluminum, calcium, magnesium and zinc, $x$ is a numerical value greater than zero but equal to or less than 6 divided by the valency of A, M is nickel and/or iron, P is phosphorus, S is sulfur and y is a numerical value between about 0.9 and 1. All of these materials are characterized as being good absorbers of visible radiation. Such variations and modifications are within the scope of the present invention.

What is claimed is:

1. An electrochemical cell in the charged state comprising: an anode consisting essentially of an anodeactive material selected from the group consisting of alkali metals, magnesium, calcium, aluminum, and zinc and combinations thereof; a cathode consisting essentially of a transition metal phosphorus trisulfide corresponding to the formula $M(PS_3)_y$ wherein M is at least one transition metal selected from the group consisting of iron and nickel and $y$ is a numerical value between about 0.9 and 1.0; and an electrolyte that is inert to the anode and the cathode and allows the passage of ions of the anodeactive material to pass from the one electrode to the other.

2. The electrochemical cell of claim 1 in which the anode-active material is lithium.

3. The electrochemical cell of claim 1 in which the anode-active material is sodium.

4. The electrochemical cell of claim 1 in which the anode-active material is potassium.

5. The electrochemical cell of claim 2 in which the electrolyte consists of lithium perchlorate in at least one organic ether and the anode-active material contains lithium.

6. The electrochemical cell of claim 5 in which the ether is a solution of tetrahydrofuran and dimethoxyethane and the cathode is nickel phosphorus trisulfide.

7. The electrochemical cell of claim 2 in which the anode material contains lithium and the electrolyte contains at least one molten salt.

8. The electrochemical cell of claim 3 in which the anode material contains sodium and the electrolyte contains at least one molten salt.

9. The electrochemical cell of claim 3 in which the anode-active material contains sodium and the electrolyte is a form of sodium beta alumina.

10. A secondary electrochemical cell in the discharged state comprising: an anode consisting essentially of an anode-active material selected from the group consisting of alkali metals, magnesium, calcium, aluminum and zinc and combinations thereof; a cathode consisting essentially of a nonstoichiometric transition metal phosphorus trisulfide corresponding to the formula $A_xM(P)S_3)_y$, wherein A is at least one Group Ia metal, $x$ is a numerical value in the range of values greater than zero and up to and including 6 divided by the valence of A, M is at least one transition metal selected from the group consisting of iron and nickel and $y$ is a numerical value between about 0.9 and 1.0; and an electrolyte that is inert to the anode and the cathode and allows the passage of ions of the anode-active material to pass from the one electrode to the other.

11. The electrochemical cell of claim 10 in which the anode-active material is lithium.

12. The electrochemical cell of claim 10 in which the anode-active material is sodium.

13. The electrochemical cell of claim 10 in which the anode-active material is potassium.

14. The electrochemical cell of claim 11 in which the electrolyte consists of lithium perchlorate in at least one organic ether and the anode-active material contains lithium.

15. The electrochemical cell of claim 14 in which the ether is a solution of tetrahydrofuran and dimethoxyethane and the cathode is nickel phosphorus trisulfide.

16. The electrochemical cell of claim 11 in which the anode material contains lithium and the electrolyte contains at least one molten salt.

17. The electrochemical cell of claim 12 in which the anode material contains sodium and the electrolyte contains at least one molten salt.

18. The electrochemical cell of claim 12 in which the anode-active material contains sodium and the electrolyte is a form of sodium beta alumina.

19. A composition of matter corresponding to the formula $A_xM(PS_3)_y$, wherein A is at least one element selected from the group consisting of Group Ia metals, aluminum, calcium, magnesium and zinc, $x$ is a numerical value between the values greater than zero and up to and including 6 divided by the valence of the element, M is at least one transition metal selected from the group consisting of nickel or iron, P is phosphorus, S is sulfur and $y$ is a numerical value between about 0.9 and 1.0.

20. The composition of matter described in claim 19 wherein A is at least one Group Ia metal.

21. The composition of matter described in claim 19 wherein A is lithium and $x$ is a numerical value in the range of values greater than zero and up to and including 4.

22. The composition of matter described in claim 19 wherein A is sodium and $x$ is a numerical value in the range of values greater than zero and up to and including 5.

23. The composition of matter described in claim 19 wherein A is potassium and $x$ is a numerical value in the range of values greater than zero and up to and including 6.

24. The electrochemical cell of claim 9 including a sodium molten salt in the cathode compartment.

25. The electrochemical cell of claim 18 including a sodium molten salt in the cathode compartment.

* * * * *